Nov. 10, 1959  W. HENNIG ET AL  2,911,894
REFLEX CAMERAS

Filed July 31, 1958 3 Sheets-Sheet 1

INVENTOR.
WALTER HENNIG
BY ALFRED SCHEINERT
KURT TAUBERT
&
HORST STREHLE

Nov. 10, 1959  W. HENNIG ET AL  2,911,894
REFLEX CAMERAS

Filed July 31, 1958  3 Sheets—Sheet 2

INVENTOR.
WALTER HENNIG
BY ALFRED SCHEINERT
KURT TAUBERT
+
HORST STREHLE

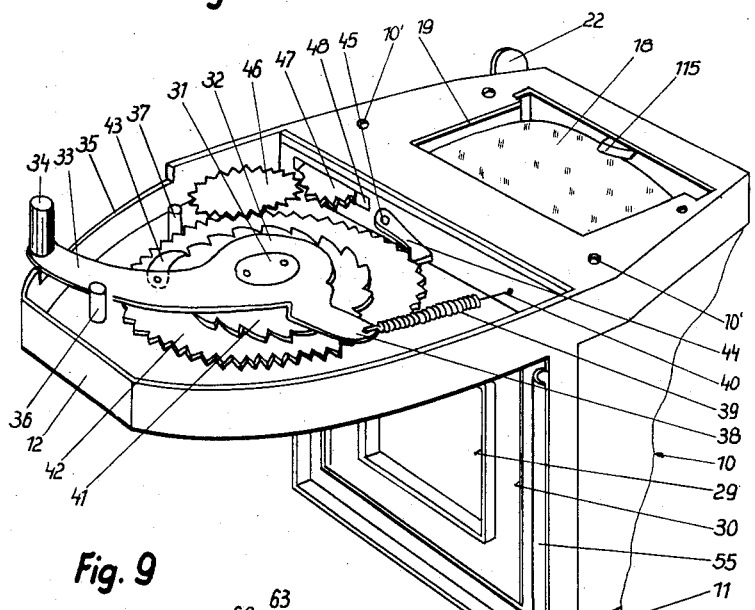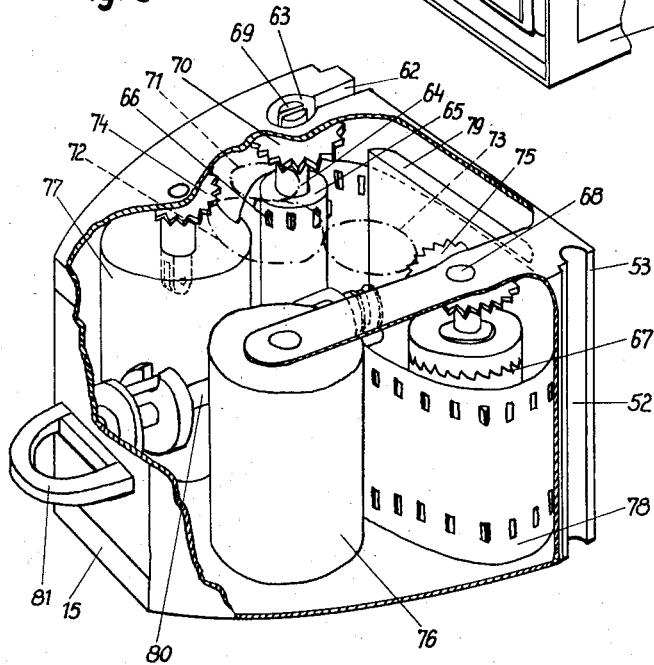

United States Patent Office 2,911,894
Patented Nov. 10, 1959

2,911,894

REFLEX CAMERAS

Walter Hennig, Alfred Scheinert, Kurt Taubert, and Horst Strehle, Dresden, Germany Application July 31, 1958, Serial No. 752,343

7 Claims. (Cl. 95—11)

This invention relates to reflex cameras, and more particularly to reflex cameras the body shape of which is substantially square or rectangular in cross-section and also longer, as viewed in the direction of the objective axis, than in a direction at right angles to this axis. The instant application is a continuation-in-part of our copending application Serial No. 438,188, filed June 21, 1954, now abandoned.

It has not been possible hitherto to design reflex cameras so as to enable beginners in the art of photography to take pictures of rapidly moving objects as easily as, for instance, a highly experienced press photographer does every day. Reflex cameras of cubic or box shape are unsuited for this purpose, since the image on the usual ground glass screen is observed from above and rapidly moving objects cannot be followed quickly enough with the inverted finder image.

To enhance the readiness for operation of small-sized reflex cameras, the latter have been provided with direct view finders and shaped so as to resemble range-finder cameras. Due to their internal arrangement, however, cameras so constructed are bulkier, clumsier and more difficult to carry than range-finder camereas. Furthermore, the lenses with their special fittings as used in reflex cameras generally are of larger diameter and greater overall length than those found in range-finder cameras.

Other types of known cameras are equipped with prism finders for horizontal viewing, to ensure that the image of the reflex mirror has uninverted sides, that the motions of the object to be photographed appear in the eyepiece as they actually occur, and that the reflection is enlarged to let the object be seen in approximately natural size. The readiness for instantaneous operation required of up-to-date cameras with high-grade optical equipment is, nevertheless, still lacking in the aforesaid known cameras, since the zone of peripheral vision is more or less shut off from the eye of the operator looking into the eyepiece by the camera wall or the rear wall of the finder housing. Of the almost 180° covered by the field of view in direct and indirect vision, only the relatively small portion of the field seen directly through the eyepiece can be used for following the moving object and seizing the most favorable moment for exposure.

Even if better viewing conditions were provided within the range of indirect vision by structural changes in such known reflex cameras, there would still remain the unavoidable disadvantage that, as a consequence of the shortness of the camera, the prism finder could not be sufficiently extended for diopter equipment. If a not normal-sighted or presbyopic operator changes from free or natural viewing to eyepiece viewing, his eye has to accommodate in different degrees, so that instantaneous seizing of the most favorable moment for exposure is eithere impossible or at least very difficult.

Another factor reducing the readiness for action of such known reflex cameras is their great width, which compels relatively inexperienced photographers to hold the camera with both hands, so that they have no hand free for necessary preparatory manipulations such as diaphragm setting, filter changing, etc.

It is, therefore, one of the principal objects of the present invention to provide a reflex camera combining greatest convenience in handling with maximum efficiency of the finder arrangement. For this purpose, the usual ratio of length to width of known reflex cameras has been reversed by making the length of the camera casing in the direrction of the objective or lens axis greater than the width of the casing transversely to this axis. The so-formed oblong camera body is substantially square or rectangular in cross-section and forms a unit with a prism finder arranged on top thereof parallel to the lens axis and preferably of trapezoidal cross-section.

Another object of the present invention is to provide a reflex camera the body of which becomes narrower at the end thereof averted from the lens, to thereby facilitate gripping of the camera with one hand from the rear as well as secure holding of the camera in this manner during a picture taking operation.

Still another object of the invention is the provision of a "one-hand" reflex camera composed of a plurality of separable units including a main body, a finder device, a film winding mechanism, and a magazine for the film and the feeding means therefor, with the finder device and film winding mechanism being connected, respectively, to the main body at the top and bottom surfaces of the latter, while the magazine is connected to the rear of the body between the finder device and the winding mechanism.

Concurrently, it is an important object of the present invention to provide the main body or housing of a reflex camera as aforesaid with a rearward roof-like extension overlying the normal position of the magazine and accommodating a film-feed control handle and gearing operatively connected to the same, as well as means adapted to be coupled with further gearing associated with the film-feeding means in the magazine when the latter is connected to the body or housing, the film-feeding means being further adapted to be operatively connected to additional gearing arranged in the film winding mechanism located therebelow.

Yet another object of the present invention is the provision of means, in a camera as aforesaid, facilitating the rapid and safe mounting and demounting of magazines on the main camera body by a single manipulation.

Reflex cameras of this type possess the advantage, not only of extreme facility of manipulation, but also of being rapidly readied for picture-taking operations. Such cameras may be comfortably gripped from their rear ends by one hand and yet so securely held in picture-taking position that the other hand of the photographer is relieved of the burden of supporting the camera and is freed for performing other operations, such as, adjusting of the objective, changing filters, etc. In order to retain these advantages in cameras having a removable and replaceable film magazine, means must be provided which not only facilitates release of the film magazine from the main camera housing by a single manipulation without simultaneously necessitating removal of either the finder device or the spring or film-winding mechanism attached to the camera housing, but which also ensure that the magazine, when in use, does not shift its position relative to the camera housing. Another of the conditions to be observed is that the means for latching the magazine to and releasing the same from the camera housing, as well as those means serving to couple the various drive elements disposed in the camera housing and the film-winding mechanism to the film-feeding means in the magazine, should not be bulky and should not project from the peripheral wall surfaces of the various parts to such an extent as to interfere with one handed gripping of the camera, nor should such means project so far as to affect adversely the field of view of the photographer above the upper surface of the camera housing and on both sides of the finder device.

The present invention thus proposes means which serve not only to enhance the readiness of small, "one-hand" reflex cameras for picture-taking operations, but also enable the operational scope of such cameras to be extended to heretofore unattainable fields.

Briefly, the present invention is embodied in a camera housing which has at its upper side a roof-like rearward extension which either completely or partially overlies the film magazine when the same is attached to the housing. This extension of the camera housing serves not only as a guide for the removable magazine, but also for accommodating of the required coupling means which interconnect the drive mechanism disposed in the the camera housing with the film-feeding means in the magazine. Viewed in the direction of the objective axis, the camera housing is tapered or narrowed toward its lens end, and the central part of the front end of the housing is so recessed that the objective may be sunk into the housing, leaving the rear adjustment rings of the objective freely accessible from both sides of the housing.

In order to facilitate releasing of the magazine from or attaching the same to the camera housing, the rear wall of the latter is provided with a bead-like post or ledge of circular cross-section, which renders possible a hinging of the magazine onto the camera housing as well as a pivotal removal of the magazine from the housing. The magazine is provided with suitable recesses at its top and bottom in order to prevent interference with the mounting or demounting thereof by the drive elements disposed in the roof-shaped extension of the camera housing and in the spring mechanism attached to the base of the camera housing.

The shape of each magazine employed in a camera as aforesaid complements that of the camera housing. To this end, the magazine is widest at that portion to be attached to the camera housing and tapers or narrows toward its rear end so as to fit easily into the hollow of the hand of the photographer.

The foregoing and other objects, characteristics and advantages of the present invention will be more clearly understood from the following detailed description thereof when considered in conjunction with the accompanying drawings, in which:

Fig. 8 is a perspective view of the camera housing with parts removed to show certain details of the interior structure thereof; and Fig. 9 is a partly sectional fragmentary, perspective view of the magazine, showing some of the internal structural elements thereof.

Figure 1:
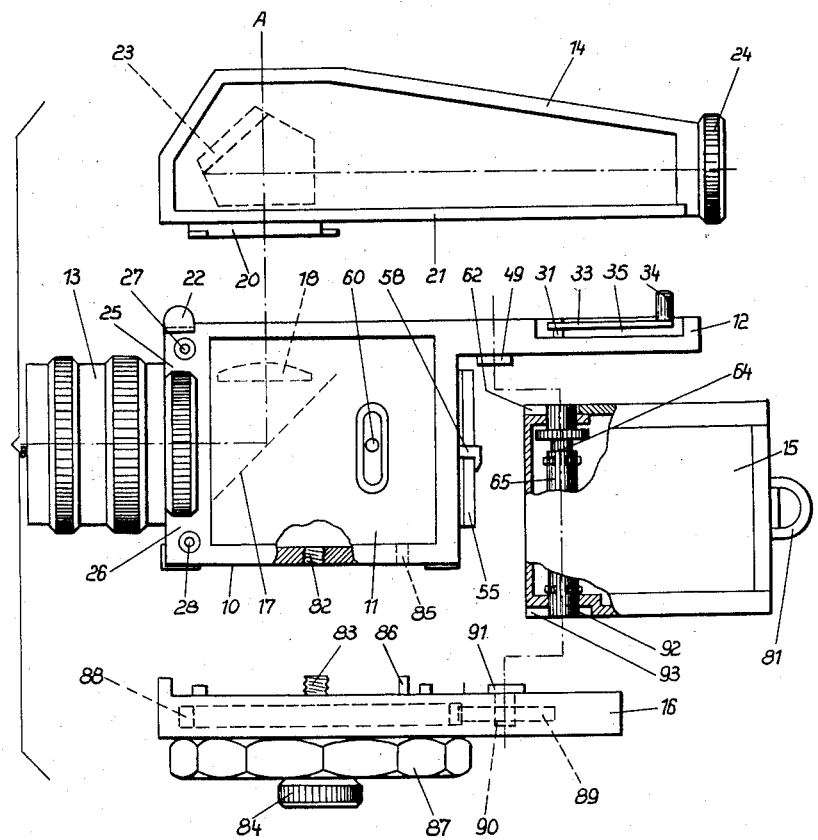
Fig. 1 is an exploded side elevational view, partly in section, of a reflex camera constructed in accordance with the present invention.

Referring first to Fig. 1, it will be seen that the reflex camera as contemplated by the present invention comprises a main body or housing 10 having a front portion 11 and a rearward roof-like extension 12 at the top thereof, an objective 13 mounted at the front of the housing, a finder device or unit 14 mounted atop the housing and extending over the rearward extension 12, a film magazine 15 attached to the rear wall of the front portion 11 of the camera housing below the extension 12, and a film-winding spring mechanism 16 attached to the bottom wall of the front portion of the camera housing and adapted to underlie at least partly the magazine 15.

Mounted pivotally within the camera housing portion 11 is a mirror or like light-deflecting means 17 which mirror may be disposed across the optical axis of the camera, as shown, and pivoted out of said axis when a picture is to be taken. Mounted above the mirror is a ground glass plate 18 which is disposed directly beneath a window or opening 19 (see Fig. 8) which is adapted to receive a downwardly depending projection 20 affixed to the base 21 of the finder device 14 so as to permit attachment of the latter to and removal thereof from the top of the camera housing 10. A latch 22 may be provided on the camera housing 10 to ensure secure retention of the finder device 14 on the housing during use of the camera. A prism or other light deflecting element 23 is positioned in the finder device 14 above a suitable opening in the base 21 thereof. An eyepiece 24 is arranged at the rear end of the finder device. Thus, any light deflected by the mirror 17 during focusing of the camera is directed rearwardly by the prism 23 toward the eyepiece 24 of the finder device, as indicated by the dot-dash line A—A in Fig. 1. The reflex mechanism so far described, which, of course, includes means for coupling the shutter release button or lever (not shown) with the mirror 17 so as to pivot the latter out of the objective axis during taking of a picture, and the latching structure 22, constitute no part of the present invention and are well known in the art, and thus no further detailed description or illustration of these structures is deemed necessary.

Figure 2:
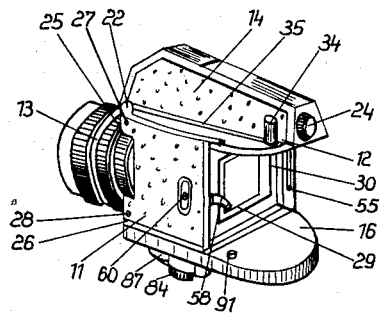
Fig. 2 is a perspective view of the camera with the film magazine removed.
Figure 7:
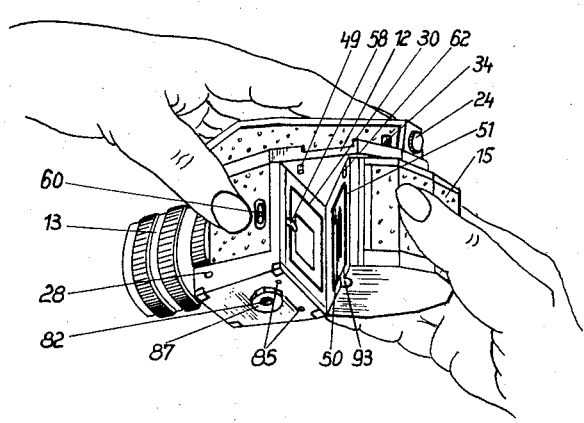
Fig. 7 is a pictorial illustration of the magazine mounting or demounting operation, the spring mechanism being omitted for the sake of clarity.

As best illustrated in Figs. 2, 7 and 8, the camera housing 10, when viewed in the direction of the lens axis, is substantially square or rectangular in cross-section and is recessed at its front end to provide upper and lower overhangs 25 and 26 between which the rear end of the objective 13 is received, the housing 10 being furthermore tapered or narrowed in the direction of its front end, whereby the rearmost ring or rings of the objective 13 project laterally of the housing portion 11 so as to be freely accessible from both sides of the latter. If desired, suitable terminals 27 and 28 may be provided in the overhanging portions 25 and 26 of the camera housing to enable use of the camera with any suitable flash bulb devices.

The rear wall of the camera housing portion 11 is provided with a picture window 29 which, as usual, is adapted to be covered from within by any suitable type of shutter, preferably a focal plane shutter (not shown). Also provided in the rear wall of the housing is a rectangular groove 30 which surrounds the picture window 29 for a purpose to be more fully described hereinafter.

As can be seen from Fig. 8, the rearward extension 12 of the camera housing 10 accommodates certain drive mechanism for winding or tensioning the shutter as well as for feeding film through the magazine 15. Both the housing portion 11 and the extension 12 are covered by a suitable cover plate (not shown) which may be affixed to the housing by means of screws threaded into bores 10' (Fig. 8). Although such mechanism per se constitutes no part of the present invention, so much thereof will be described as is necessary to facilitate an understanding of the present invention.

Fixedly arranged in the extension 12 is a pivot bolt 31 on which is rotatably mounted the hub 32 of an operating lever 33 provided with a handle 34 at its outer end. The extension 12 at one side thereof is provided with a recess or cut-out 35 through which the outer end of the lever 33 extends and is adapted to be displaced when the handle 34 is shifted by the photographer. Two stops or abutments 36 and 37, which define the limits of angular movement of the lever 33, are mounted in the extension 12 substantially opposite the ends of the recess 35. The hub 32 of this lever is provided with a lug 38 to which is connected a spring 39 anchored at 40 to the camera housing, whereby the lever 33 is biased toward and normally retained against the stop 36.

Also rotatably journalled on the pivot bolt 31 are a ratchet 41 and a spur gear 42 which are fixedly connected with one another. Pivotally attached to the bottom surface of the lever 33 intermediate the ends thereof is a pawl 43 which is pressed by a spring (not shown) against the periphery of the ratchet 41. A second spring-pressed pawl 44 is pivotally mounted in the extension 12 at 45 and is pressed against the periphery of the gear 42. The latter gear meshes with an intermediate gear 46 which in turn meshes with a gear 47 journalled interiorly of the housing portion 11 and projecting into the extension 12 through a slot 48, the gear 47 being connected to the shutter winding and tensioning mechanism (not shown) hereinabove referred to. The gear 46 is mounted on a rotatably journalled stub shaft (not shown) which extends through the bottom wall of the extension 12 and terminates in a coupling element 49 (see Fig. 1). It will, therefore, be readily understood that when the operating or control handle 34—33 is shifted along the opening 35, the pawl 43 entrains the ratchet 41 and gear 42 into rotation to actuate the shutter means in the housing portion 11 and via gear 46 and other means still to be described, the film-feeding means in the magazine 15. Upon return of the handle to its starting position, rotation of the gear 42 and all elements connected therewith is inhibited by the pawl 44.

Figure 3:
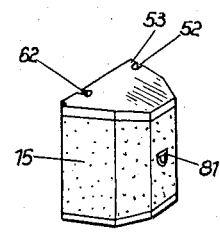
Fig. 3 is a perspective view of a magazine to be attached to the housing shown in Fig. 2.
Figure 4:
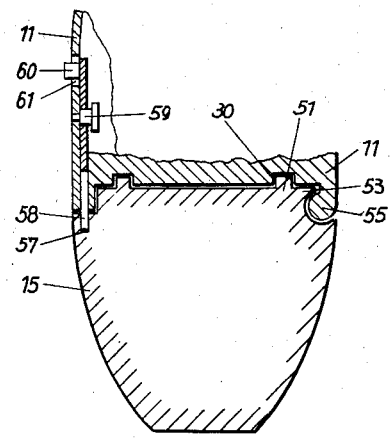
Fig. 4 is a diagrammatic, fragmentary, partly sectional view of a connected camera housing and magazine.
Figure 5:
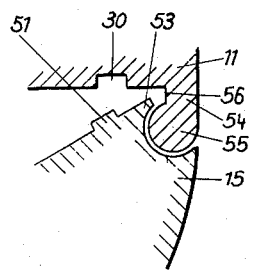
Fig. 5 is an enlarged view of a detail of the structure shown in Fig. 4, illustrating the relative positions of the housing and magazine during mounting or demounting of the latter.
Figure 6:
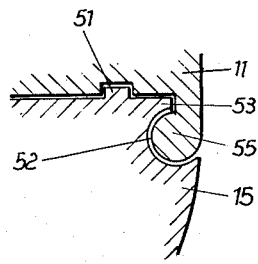
Fig. 6 is a detail view similar to Fig. 5, showing the magazine in mounted position.

The magazine 15 (see Fig. 3), which is to be connected to the camera housing 10 so as to form a unit therewith, has a shape complementary to that of the housing. Thus, as can be seen from Figs. 7 and 9, the magazine has a substantially square or rectangular cross-section when viewed in the direction of the objective lens axis and tapers or narrows toward its rear end. It is this complementary shaping of the housing and magazine which imparts to the composite camera body, when assembled, a shape as outlined somewhat schematically in Fig. 4, whereby the photographer can easily hold the camera in one hand by pressing the rear end of the magazine into the hollow of his hand, i.e., into the space between the thumb and forefinger.

Referring specifically to Figs. 2 to 7, it will be seen that the front wall of the magazine is provided with a rectangular opening or window 50 behind which the film is positioned and past which it is moved subsequent to each exposure by means to be more fully described hereinafter. The opening 50 is surrounded by a ridge 51 corresponding in shape and contour to the groove 30 formed in the rear wall of the camera housing portion 11. At one of its front corners (the right one in the drawings), the magazine is provided with a vertically extending groove or channel 52 of substantially circular cross section and open along a portion of its circumference, whereby there is formed at the juncture between the said groove and the front wall of the magazine an elongated ledge 53. Correspondingly, there is provided at one of the rear corners of the camera housing portion 11 a vertically extending ledge 54 the outermost portion of which is shaped in the form of a substantially circular post 55 projecting from the outermost periphery of the housing slightly inwardly of the latter. As a consequence of this construction, there is formed between the rear wall of the housing portion 11 and the inwardly projecting post 55 a vertically extending groove or channel 56. Provided at the opposite front corner of the magazine 15 is a catch recess 57. Correspondingly, a latch member or catch lever 58 is pivotally mounted on a stud 59 in the side wall of the housing portion 11 opposite that side wall from which the ledge 54 and post 55 extend. The front end of the lever 58, as best shown in Fig. 2, is shaped in the form of a hook, and the rear end of this lever is provided with a knob or handle 60 extending outwardly of the housing portion 11 through a slot 61 (see Fig. 4). The magazine 15 is further provided with a short, slightly curved slot or recess 62 in its upper surface.

From the foregoing it will be readily appreciated that mounting of the magazine 15 on the camera housing, as well as releasing of the magazine from the housing, can now be effectuated in a most simple manner, as best indicated in Fig. 7. Thus, assuming that the camera housing and magazine are to be connected to one another, the photographer grasps the housing in his left hand and the magazine in his right and fits the groove 52 of the latter over the post 55 provided at the side of the camera housing (see also Fig. 5). Now he merely pivots the magazine about the axis of the post 55, which, it will be readily recognized, serves as a hinge support for the magazine, until the ledge 53 has fully entered the channel 56 while the ridge 51 is received in the groove 30. The presence of the recess 62 prevents any possible interference with the above described motion of the magazine toward the camera housing, inasmuch as the coupling element 49 will be received in the said slot which effectively moves past the coupling element. Upon completion of the closing movement of the magazine, the hook end of the catch lever 58 will enter the catch recess 57 of the magazine and will be retained in latching position by means of a spring (not shown) suitably anchored to bias the lever 58 clockwise about the axis of the pivot member 59. If it is now desired to release the magazine from the camera housing, it is merely necessary to depress the knob 60 against the force of this spring so as to raise the hook end of the catch lever 58, whereafter the magazine is pivoted outwardly until it can be separated from the post 55. When the magazine and housing are connected to one another, the groove 30 and ridge 51 prevent any entry of light into the camera.

As stated hereinabove, the magazine 15 contains the film-feeding means as well as certain other mechanisms normally employed in cameras. None of these mechanisms, of course, forms a part of the present invention, being well known to those skilled in the art, and only the film-feeding means and certain adjuncts thereof will be briefly described to facilitate a full understanding of the invention.

Rotatably journalled in the magazine 15 (see Fig. 9) and axially aligned with the rear end 63 of the slot or recess 62 is a shaft 64 on which is mounted a film-feeding drum 65 provided, as usual, with sprockets 66, and a second sprocket-equipped film feeding drum 67 is rotatably journalled in the magazine and operatively connected to a rotatable shaft 68 adjacent the opposite front corner of the magazine. The upper end of the shaft 64 terminates in a slotted coupling element 69 extending into the end 63 of the recess 62, this coupling element being adapted to be engaged with the coupling element 49 when the latter enters the slot 62 upon mounting of the magazine on the camera housing. Fixed to the shaft 64 immediately below the top of the magazine is a gear 70 which meshes with a train of gears 71, 72, 73, 74 and 75, the gear 75 being mounted on the shaft 68 and adapted to rotate the latter and therewith the drum 67. Mounted behind the drum 67 is a film supply container 76, and a film take-up container 77 is disposed behind the film-feeding drum 65. Film 78 leaving the supply container 76 is passed around the drum 67 past the opening 50 and thence around the drum 65 into the take up container 77, the spool in the latter being driven through the intermediary of the gear 74. For the purpose of holding the film flat against the front wall of the magazine, there is provided in the latter and immediately behind the opening 50 a press plate 79 which is resiliently biased in the direction of the opening 50 and is adapted to be displaced toward and away from the latter through the intermediary of a shaft 80 and an exteriorly accessible handle 81 provided at the rear end of the magazine.

It will, therefore, be appreciated that, in accordance with the transmission ratio of the gear train 71 to 75 and the gears 42 and 46, whenever the handle 34 is displaced from its rest position as shown in Fig. 8 toward and against the abutment or stop 37, the film 78 will be fed from the container 76 to the container 77 by an amount equal to one frame, so as to present a fresh unexposed portion of the film behind the window or opening 50.

The present invention further contemplates the provision, in a reflex camera as aforesaid, of a spring-type film winding mechanism 16 to be attached to the base of the camera housing 10. Such a mechanism will generally be employed in serial photography operations, whereas the lever 33 is generally employed in taking single pictures. To this end there is provided in the base of the housing portion 11 a threaded bore 82 adapted to receive a screw or threaded bolt 83 extending through the mechanism 16 and actuatable from below the latter by a knurled knob 84. In order to ensure proper alignment of the mechanism 16 relative to the housing portion 11, the latter is provided in its base with a pair of small bores 85 into each of which a dowel pin 86 (only one of which is shown in Fig. 1) is adapted to extend.

The actual construction of the mechanism 16 forms no part of this invention and thus is described only for the sake of clarity. Briefly stated, the film-winding mechanism 16 comprises a large knob 87 within which is suitably arranged a torsion spring (not shown), as is well known in the art. This spring is tensioned by rotation of the knob 87 and is operative to drive a gear 88 which meshes with a further gear 89 mounted on a short rotatable stub shaft 90 the upper end of which terminates in a coupling element 91 substantially similar to the coupling element 49. A corresponding coupling element 92 is formed at the lower end of the shaft 64 of the film feeding drum 65, the element 92 being engagable with the coupling element 91. In order to ensure that the magazine 15 can be pivoted about the post 55 toward and away from the rear wall of the housing portion 11 without any interference from the coupling element 91, there is provided in the base of the magazine a slightly curved slot or recess 93 into the rear end of which the coupling element 92 extends, this recess at the same time being positioned and dimensioned to accommodate the element 91 during the pivotal movement of the magazine. Thus, even when the mechanism 16 is attached to the camera housing 10, the manipulation shown in Fig. 7, i.e., the mounting or demounting of the magazine, can be easily carried out.

It will be noted, furthermore, that the finder unit 14 also is widest at its front end and tapers or narrows toward its rear end, and that this unit is generally narrower than the housing 10 and the extension 12. The advantage of this construction is that the photographer, when sighting through the eyepiece 24 with one of his eyes only, has his other eye completely free for direct viewing of the object or scene to be photographed and that the field of view of both eyes, covering their zones of direct as well as indirect vision, is as wide as possible, being unobstructed by the sides of the finder unit or device 14.

We have described a preferred embodiment of a "one-hand" and "one-eye" camera according to our invention, but it is understood that this disclosure is for the purpose of illustration only and that various omissions and changes in shape, proportion and arrangement of the parts, as well as the substitution of equivalent elements for the arrangements shown and described, may be made without departing from the scope of the invention as set forth in the appended claims.

We claim:
1. In a "one-hand" reflex camera; a composite body including an objective-equipped housing containing shutter means, and a film magazine containing film-feeding means, said composite body being substantially rectangular in cross-section as viewed along the objective axis thereof, of greater dimension in the direction of said axis than transversely thereto, and tapered substantially from the junction of said housing and magazine toward its front and rear ends, a rearward extension for said housing attached to the top of the latter and accommodating first drive means for said film-feeding means and said shutter means, a winding mechanism connected to the base of said housing and extending rearwardly therefrom below said extension and accommodating second drive means for said film-feeding means, and cooperable means on said housing and said magazine hingedly connecting the latter to the former in the space between said extension and said winding mechanism and constructed to permit removal of said magazine from said housing, said first and second drive means each including a respective coupling element drivingly engageable with said film-feeding means when said magazine is connected to said housing to form said composite body, and said magazine being provided with a slot-like recess at both its top and its bottom front edges, which recesses are constructed to permit passage therethrough of the respective coupling elements during hinging displacement of said magazine relative to said housing.

2. In a reflex camera according to claim 1; said cooperable means comprising a ledge projecting rearwardly from one of the rear side edges of said housing below and at right angles to said extension, said ledge including a relatively wider portion spaced from said one rear side edge of said housing and of substantially circular cross-section and a contiguous relatively narrower portion intermediate said wider portion and said housing, said cooperable means further comprising a groove of substantially circular cross-section provided at one of the front side edges of said magazine and cut away over a portion of its periphery to permit insertion thereinto of said wider portion of said ledge, the latter thus constituting a hinge post for said magazine.

3. In a reflex camera according to claim 2; latch means mounted on one of said housing and magazine for engagement with the other of said housing and magazine upon completion of the hinging movement of said magazine toward said housing to releasably secure said magazine and said housing to one another.

4. In a reflex camera according to claim 1; means for removably connecting said winding mechanism to said housing.

5. In a reflex camera according to claim 1; a prism-type finder unit removably positioned atop said housing and said extension, said finder unit being narrower than said housing and tapering from its front end to its rear end to provide an unobstructed field of view of maximum width for a photographer.

6. In a reflex camera according to claim 1; said extension being provided with a lateral elongated opening, said first drive means also comprising an operating lever extending outwardly through said opening and displaceable reciprocally therealong for effecting operation of said shutter means and said film-feeding means.

7. In a "one-hand" reflex camera; a composite body including an objective equipped housing containing shutter means, and a film magazine containing film-feeding means, said composite body being substantially rectangular in cross-section as viewed along the objective axis thereof, of greater dimension in the direction of said axis than transversely thereto, and tapered substantially from its center toward its front and rear ends, a rearward rooflike extension oriented parallel to said axis and constituting a part of said housing and accommodating first drive means for said film-feeding means and said shutter means, a winding mechanism connected removably to the base of said housing and extending rearwardly therefrom below said extension and accommodating second drive means for said film-feeding means, separable hinge means on said housing and said magazine at corresponding corners thereof for connecting said magazine hingedly to said housing at a location between said extension and said winding mechanism and constructed to permit removal of said magazine from said housing, a first coupling element constituting a part of said first drive means and projecting downwardly from said extension for driving engagement with a first portion of said film-feeding means when said magazine is connected to said housing to form said composite body, and a second coupling element constituting a part of said second drive means and projecting upwardly from said winding mechanism for driving engagement with a second portion of said film-feeding means when said magazine is connected to said housing, said magazine being provided with first and second slot-like recesses at its top and bottom, respectively, which are constructed to permit passage therethrough of said first and second coupling elements, respectively, during hinging displacement of said magazine relative to said housing.

References Cited in the file of this patent

UNITED STATES PATENTS

| | | |
|---|---|---|
| 2,252,640 | Nuchterlein | Aug. 12, 1941 |
| 2,293,195 | Cohen | Aug. 18, 1942 |
| 2,566,267 | Wallace | Aug. 28, 1951 |
| 2,679,196 | Sochoretal | May 25, 1954 |